Patented July 8, 1952

2,602,804

UNITED STATES PATENT OFFICE 2,602,804

METHODS AND COMPOUNDS USEFUL IN THE PRODUCTION OF 17-HYDROXYSTEROIDS

Edward C. Kendall, Rochester, Minn., assignor to Research Corporation, New York, N. Y., a corporation of New York No Drawing. Application January 25, 1951, Serial No. 207,827

5 Claims. (Cl. 260—397.4)

This invention relates to methods and compounds useful in the production of 17-hydroxysteroids and particularly for the production of 11-dehydro-17-hydroxycorticosterone (Cortisone).

It has been found that 3(a),21-diacetoxy-11,20-diketo-12(a)-bromopregnane (I) and its 3(a),21,21-triacetoxy-(II) and 12,21-dibromo-(III) derivatives can readily be converted in good yield into 3(a),21-diacetoxy-11,20-diketo-12(a),15,21-tribromo-$\Delta^{16}$-pregnene (IV) by bromination in a polar solvent, such as a lower aliphatic acid or dioxane, under substantially anhydrous conditions. The 15,21-bromo substituents may readily be removed from IV, for example, by treatment with hydriodic acid to give 3(a),21-diacetoxy-11, 20-diketo-12(a)-bromo-$\Delta^{16}$-pregnene (V).

Compound V can be converted to Cortisone by a variety of routes involving epoxylation of the $\Delta^{16}$ double bond, conversion of the 16, 17-epoxy to the 16-bromo-17-hydroxy compound, bromination at the 4-position, dehydro-bromination to the $\Delta^{4,5}$ compound, and elimination of the 12- and 16-bromines. These steps can be effected in various orders and various ways.

The principles of the invention are illustrated by the following structural formula (in which the 10- and 13-angular methyl groups are shown only by tie-lines at these positions) showing a typical route, and by the illustrative examples thereafter:

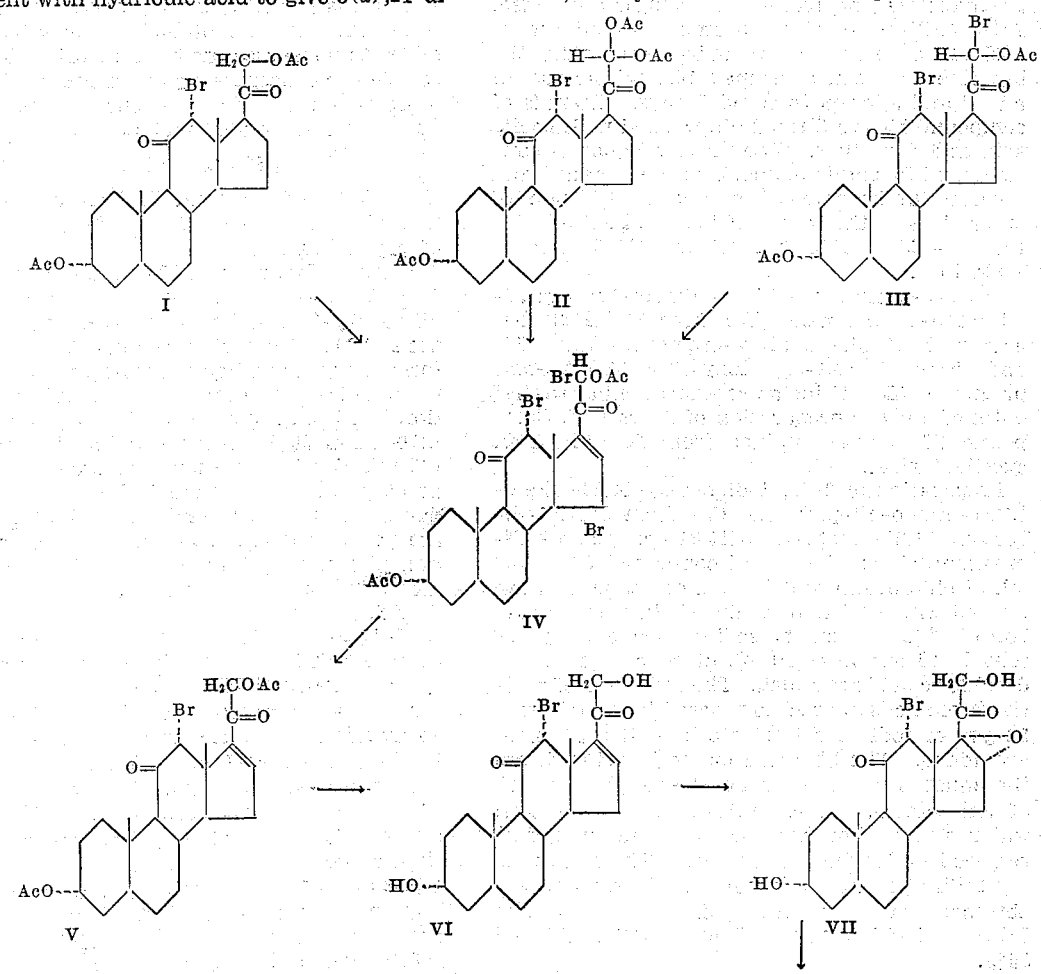

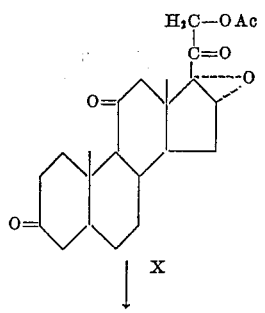
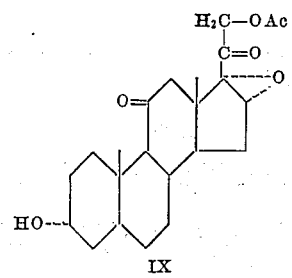
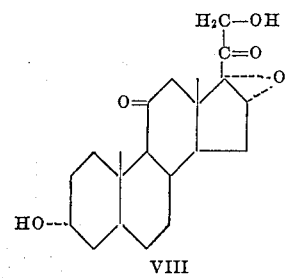

X    IX    VIII

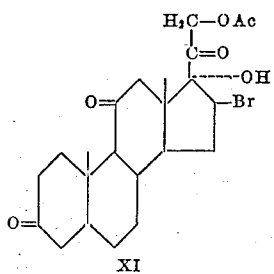
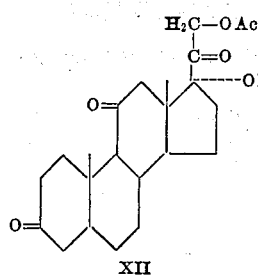
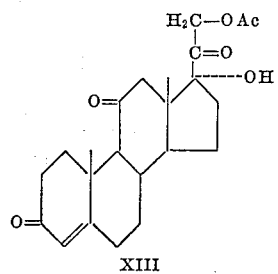

XI    XII    XIII

Preparation of 3(a),21-diacetoxy-11,20-diketo-12(a), 15,21-tribromo-$\Delta^{16}$-pregnene (IV) from 3(a),21-diacetoxy-11,20-diketo-12(a)-bromopregnane (I): To 1200 ml. acetic acid are added 20 ml. of acetyl bromide and hydrogen bromide is removed under reduced pressure. 102 gm. of 3(a),21-diacetoxy-11,20-diketo-12(a)-bromopregnane (I) and 10.2 ml. of bromine are added. After utilization of all bromine an additional 10.2 ml. of bromine are added; and after the bromine has been consumed 10.2 ml. are again added and allowed to stand 7 days. Crystals of compound IV are filtered off, washed with acetic acid and dry ether. The mother liquor is concentrated to small volume, benzene is added and removed under reduced pressure. Addition of ether gives further crops of IV. M. P. 231-2° C.; $[\alpha]_D = -62°$ (CHCl$_3$); $\epsilon$ 235 m$\mu$=8700 (ether). Yield 75%.

3(a),21-diacetoxy-11,20-diketo-12(a),15,21-tribromo-$\Delta^{16}$-pregnene (IV) from 3(a),21,21-triacetoxy-11,20-diketo-12(a)-bromopregnane (II) and from 3(a),21-diacetoxy-12(a),21-dibromopregnane (III): Using a procedure similar to that outlined for the preparation of IV from I, Compound IV is also obtained from II and III in excellent yield.

Preparation of 3(a),21-diacetoxy-11,20-diketo-12(a)-bromo-$\Delta^{16}$-pregnene (V) from 3(a),21-diacetoxy-11,20-diketo-12(a),15,21-tribromo-$\Delta^{16}$-pregnene (IV): 37.5 gm. of compound IV in 400 ml. of chloroform and 285 ml. of acetic acid are treated with 68 gm. of sodium iodide under carbon dioxide. When the sodium iodide is all dissolved (10 minutes) 10 ml. of concentrated hydrochloric acid are added. The reduction of positive bromine is allowed to proceed for 60 minutes. 56 gm. of sodium thiosulfate in 1 liter of water are added. The liberated iodine is reduced and the aqueous phase is washed twice with 100 ml. of chloroform, the chloroform is washed with water and sodium bicarbonate solution and is removed under partial pressure. The residue is crystallized from methanol and four crops are obtained. The melting point is 165-6° C.; $[\alpha]_D = +34°$(CHCl$_3$); $\epsilon_{235m\mu}$=9000(CH$_3$OH). Yield 85%.

3(a),21-dihydroxy-11,20-diketo-12(a)-bromo-16,17-epoxypregnane (VI) from 3(a),21-diacetoxy-11,20-diketo-12(a)-bromo-$\Delta^{16}$-pregnene (V): 90 gm. of compound V are dissolved in 1800 ml. of 95% ethanol, 1800 ml. of water and 12 ml. of concentrated hydrochloric acid. The solution is refluxed 15 hours under carbon dioxide. The solution is cooled and the crystals separated by filtration. 12 gm. of sodium bicarbonate are added to neutralize the hydrochloric acid and the solution is concentrated under reduced pressure. More crystalline material separates as crops 2, 3 and 4. Compound VI melts at 246-7° C.

$[\alpha]_D = +33°$(CH$_3$OH): $\epsilon_{235m\mu}$=8600

Yield 83%. Compound VI separates combined with about 15 per cent of its weight of chloroform of crystallization.

3(a),21-dihydroxy-11,20-diketo-12(a)-bromo-16(a),17(a)-epoxypregnane (VII) from 3(a),21-dihydroxy-11,20-diketo-12(a)-bromo-$\Delta^{16}$-pregnene (VI): 46 gm. of compound VI with chloroform of crystallization are dissolved in 3300 ml. of methanol and 380 ml. of water. After the solution has been cooled to 0° C. hydrogen peroxide (310 ml. of 30% solution) and sodium carbonate (45 ml. of a 5% solution) are added. The temperature of the solution is held at 0° C. for 5 hours. 4 liters of water and 1 ml. of acetic acid are poured into the solution and the crystalline precipitate, after 3 hours at 0° C., is removed by filtration, washed with water and dried. Crystallized from acetone, compound VII melts at 250-2° C., $[\alpha]_D = -1°$. Concentration of the solution to about a half its volume yields a second crop, 1.75 gm. of compound VII. Yield 94%.

3(a),21-dihydroxy-11,20-diketo-16(a),17(a)-epoxypregnane (VIII) from 3(a),21-dihydroxy-11,20-diketo-12(a)-bromo-16(a),17(a)-epoxypregnane (VII): 35.7 gm. of VII are dissolved in 1200 ml. of methanol and 120 ml. of water and treated with 70 gm. of 2% palladium oxide on calcium carbonate in an atmosphere of hydrogen at a pressure of about 1 atmosphere. The atom of bromine is rapidly removed (about 15 minutes). After a total of 35 minutes the calcium carbonate is filtered off and concentration of the methanolic solution and addition of water yields compound VIII. The melting point is 196–7° C. $[\alpha]_D = +93°$. Yield 92%.

3($\alpha$)-hydroxy-21-acetoxy-11,20-diketo-16($\alpha$),17($\alpha$)-epoxypregnane (IX) from 3($\alpha$),21-dihydroxy-11,20-diketo-16($\alpha$),17($\alpha$)-epoxypregnane (VIII): A solution of 4.8 gm. of VIII in 12 ml. of dry pyridine and 1.45 ml. of acetic anhydride is maintained at −18° C. for 40 hours. Crystals of IX separate, chips of ice are added and the insoluble material is removed by filtration. Compound IX is crystallized from chloroform and dry ether. The melting point of IX is 235–7° C.; $[\alpha]_D = +99°$. Yield 89%.

3,11,20-triketo-21-acetoxy-16($\alpha$),17($\alpha$)-epoxypregnane (X) from 3($\alpha$)-hydroxy-21-acetoxy-11,20-diketo-16($\alpha$),17($\alpha$)-epoxypregnane (IX): 10 gm. of IX are dissolved in 300 ml. of CHCl₃ and 75 ml. of acetic acid. The solution is cooled to 0° C. Under vigorous mechanical stirring 2.7 ml. of 23.7 N chromic acid in water is added to the chloroform solution of IX at such a rate that the temperature does not reach 5° C. 15 minutes after addition of the CrO₃ 2.75 ml. of 17.7 N sulfuric acid are added and the solution is stirred for 90 minutes. Water and chloroform are added and the steroid is extracted from the aqueous phase. The chloroform solution is washed with water and dilute hydrochloric acid solution and twice with water, dried, and concentrated to a very small volume. Compound X is crystallized from acetic acid and water. The product melts at 132–3° C.; $[\alpha]_D = +108°$ (CHCl₃). Yield 87%.

3,11,20-triketo-21-acetoxy-17($\alpha$)-hydroxy-16($\beta$)-bromopregnane (XI) from 3,11,20-triketo-21-acetoxy-16($\alpha$),17($\alpha$)-epoxypregnane (X): To a solution of 1.1 gm. of X dissolved in 35 ml. of chloroform at −18° C., 10 ml. (3.5 equivalents) of an acetic acid solution of 0.97 N hydrogen bromide are added. After 16 hours at −18° C. the steroid is separated by addition of chloroform and water and the organic phase is washed with water and a 5 per cent solution of sodium bicarbonate. The chloroform is reduced to a small volume and the bromohydrin is crystallized by addition of dry ether. The melting point is 189–90° C.; $[\alpha]_D = +51°$ (CHCl₃). Yield 91%.

3,11,20-triketo-21-acetoxy-17($\alpha$)-hydroxypregnane (XII) from 3,11,20-triketo-21-acetoxy-17($\alpha$)-hydroxy-16($\beta$)-bromopregnane (XI): 5.9 gm. of XI are dissolved in 200 ml. of methanol and 15 ml. of water and treated with 12 gm. of 2% palladium oxide suspended on calcium carbonate in an atmosphere of hydrogen. After reductive removal of the bromine for 1 hour the calcium carbonate is filtered off and the methanol is concentrated to a small volume. The residue is dissolved in benzene and the benzene solution is washed with water, dried and concentrated to small volume, and the last traces of benzene are displaced with acetic acid. The solution is warmed and the addition of water causes separation of compound XII in crystalline form. The product melts at 234–5° C.; $[\alpha]_D = +84°$ (acetone). Yield 90%.

Conversion of compound XII (4,5-dihydro-Cortisone acetate) to Cortisone acetate by bromination at the 4-position and dehydrobromination, for example, by treatment with dinitrophenylhydrazine are known steps.

The acyl group of the compounds described in the foregoing example is not critical and the acetyl group may be replaced by other organic carboxylic acids such as other lower aliphatic monocarboxylic acids.

This application is a continuation-in-part of application Serial No. 161,023 filed May 9, 1950, now abandoned.

I claim:

1. 3($\alpha$),21-diacetoxy-11,20-diketo-12($\alpha$),15,21-tribromo-$\Delta^{16}$-pregnene.

2. The method which comprises treating a compound of the general formula

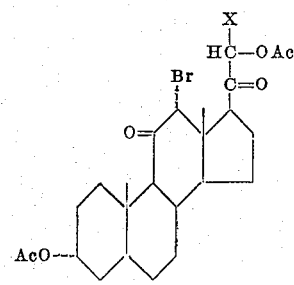

wherein Ac represents an organic carboxylic acyl group and X is selected from the group consisting of hydrogen, bromine and OAc, with bromine in a polar solvent under substantially anhydrous conditions and in the presence of hydrogen bromide to produce a $\Delta^{16}$-pregnene of the general formula

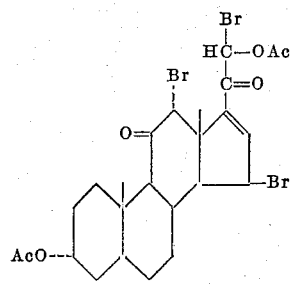

wherein Ac represents an organic carboxylic acyl group.

3. The method defined in claim 2 wherein the polar solvent is acetic acid.

4. The method which comprises treating 3($\alpha$),21-diacetoxy-11,20-diketo-12($\alpha$)-bromopregnane with bromine in a polar solvent under substantially anhydrous conditions to produce 3($\alpha$),21-diacetoxy-11,20-diketo-12($\alpha$),15,21-tribromo-$\Delta^{16}$-pregnene.

5. The method defined in claim 4 wherein the polar solvent is acetic acid.

EDWARD C. KENDALL.

No references cited.